2,832,022
REMOTE SERVOMOTOR CONTROL SYSTEM

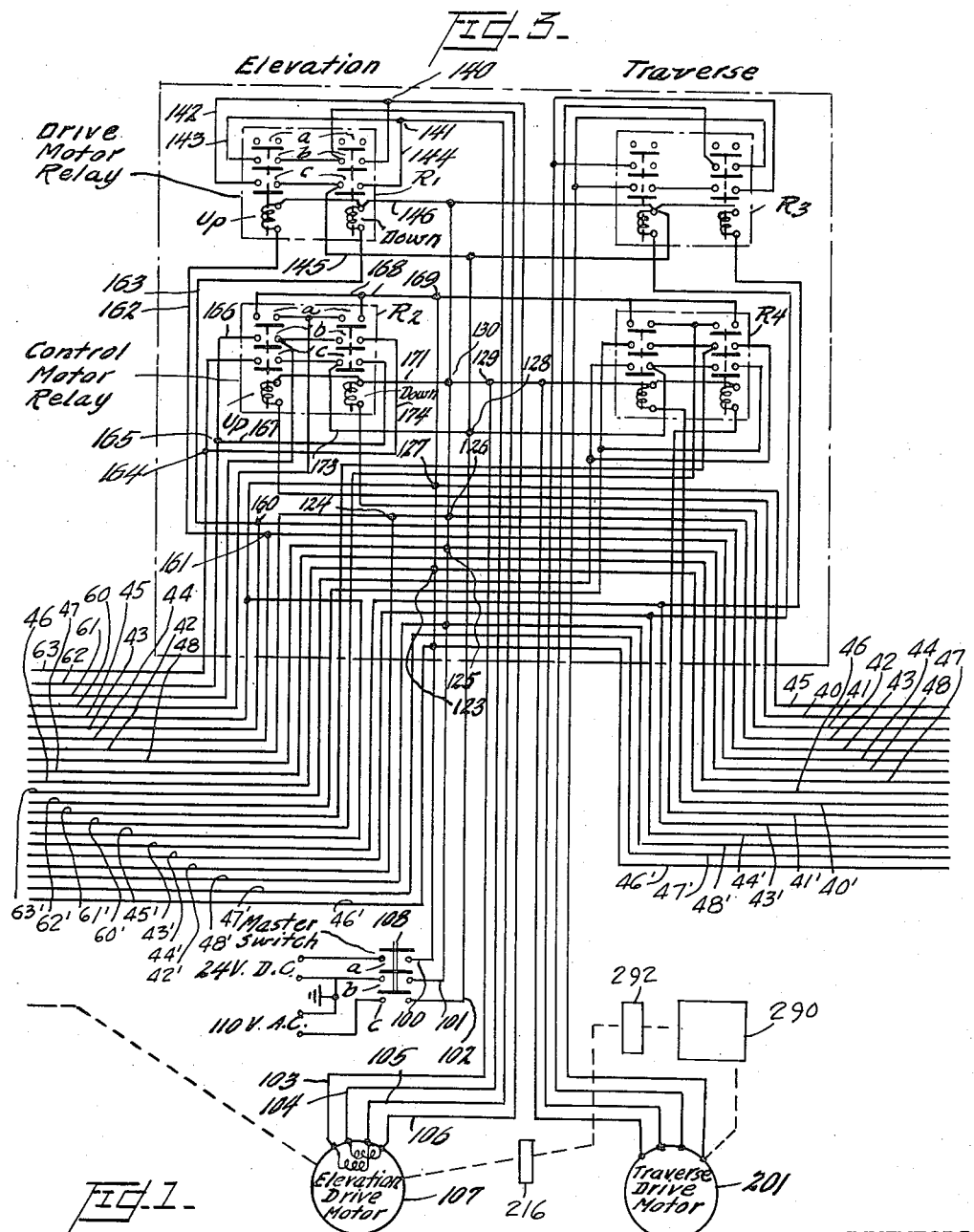

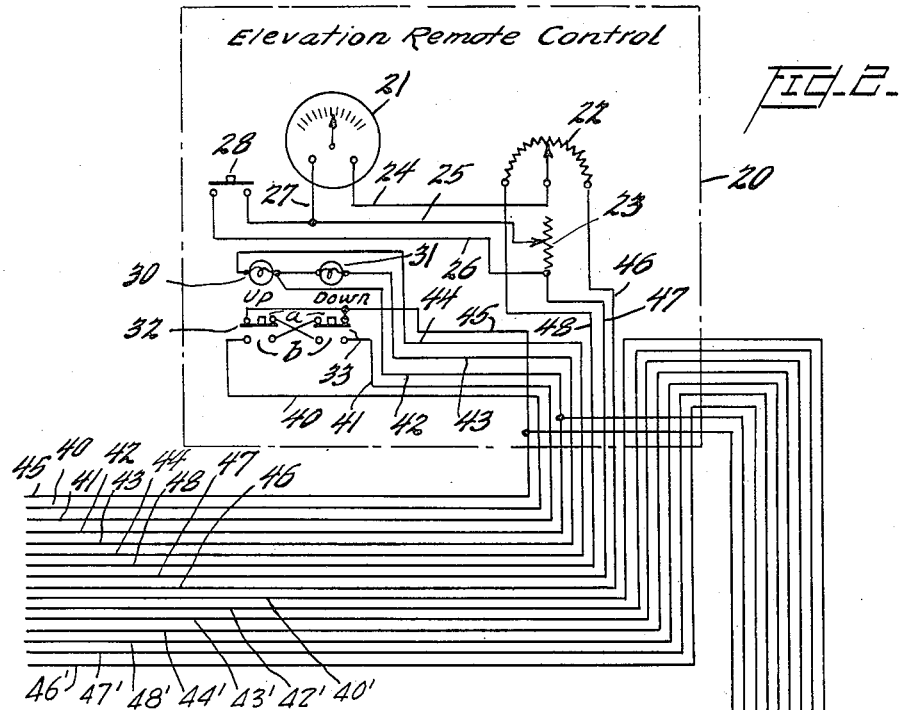
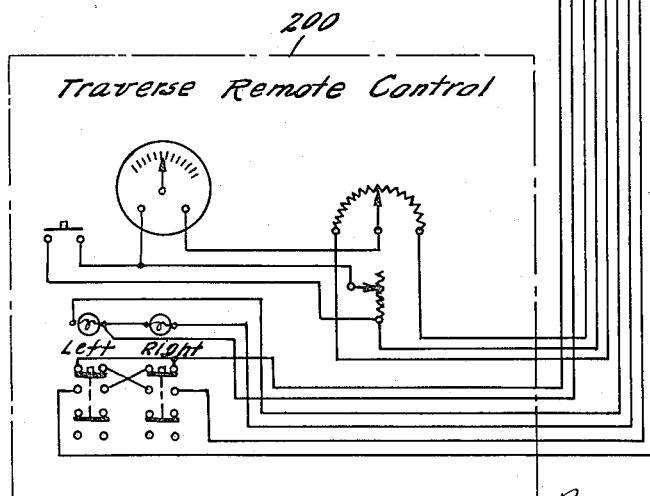

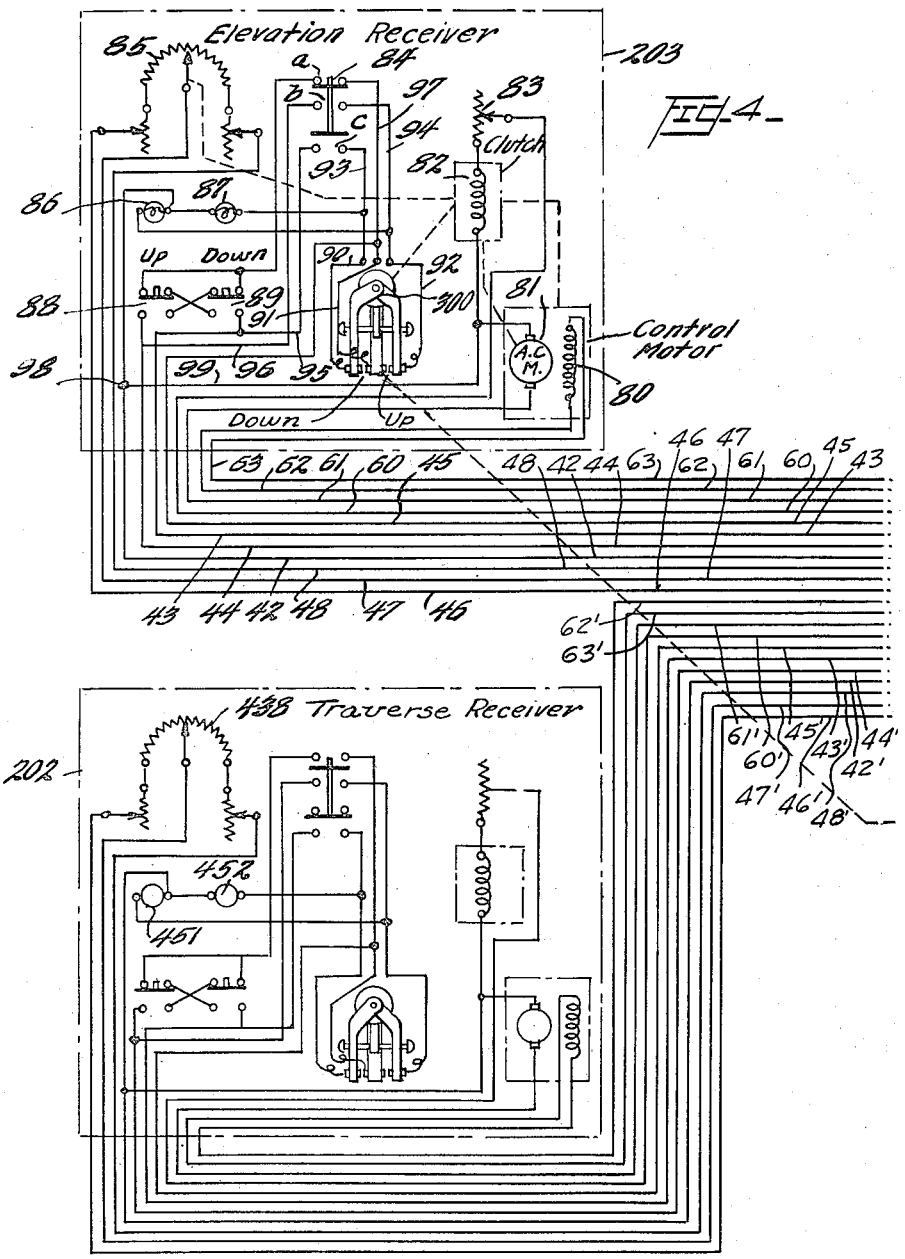

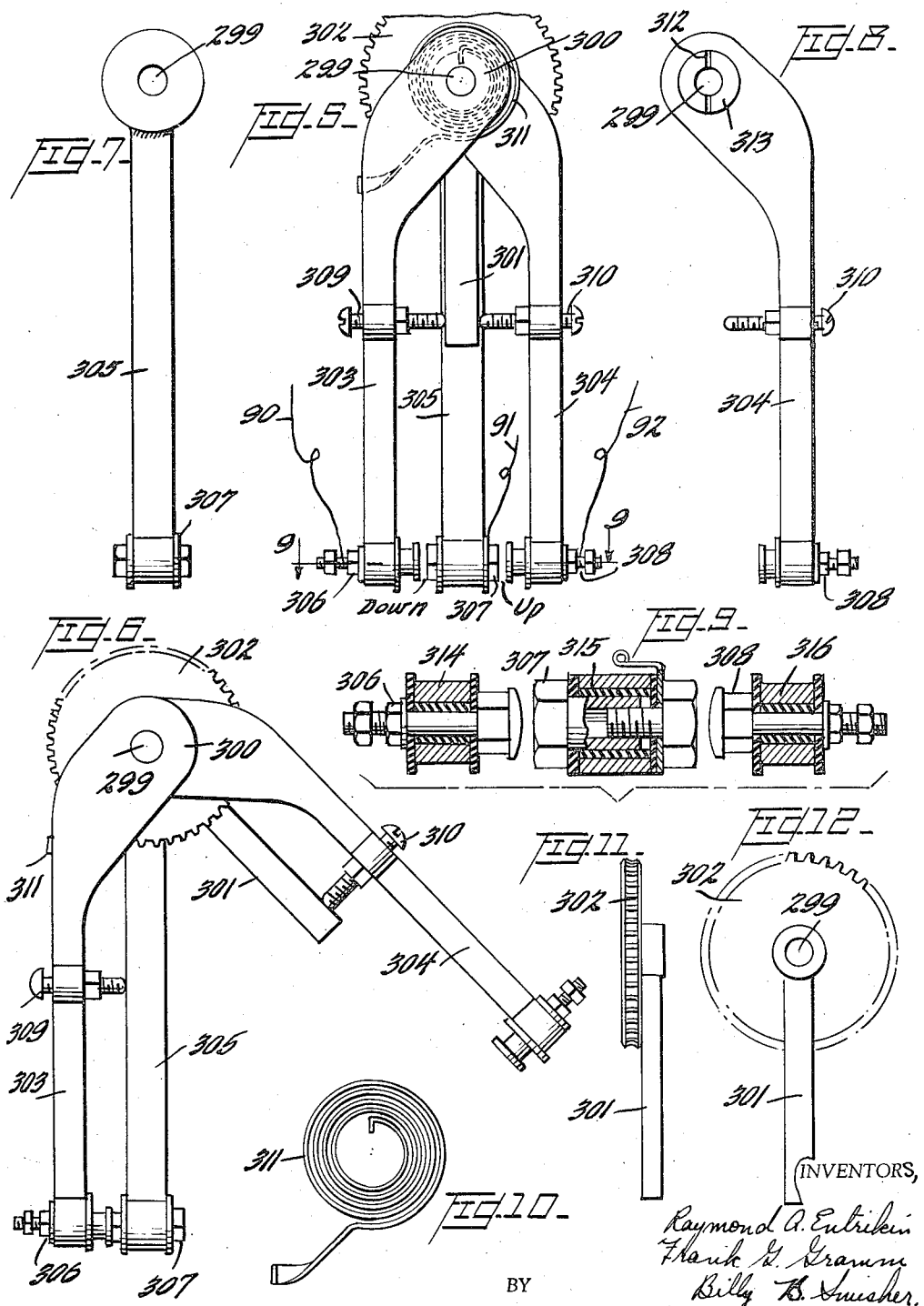

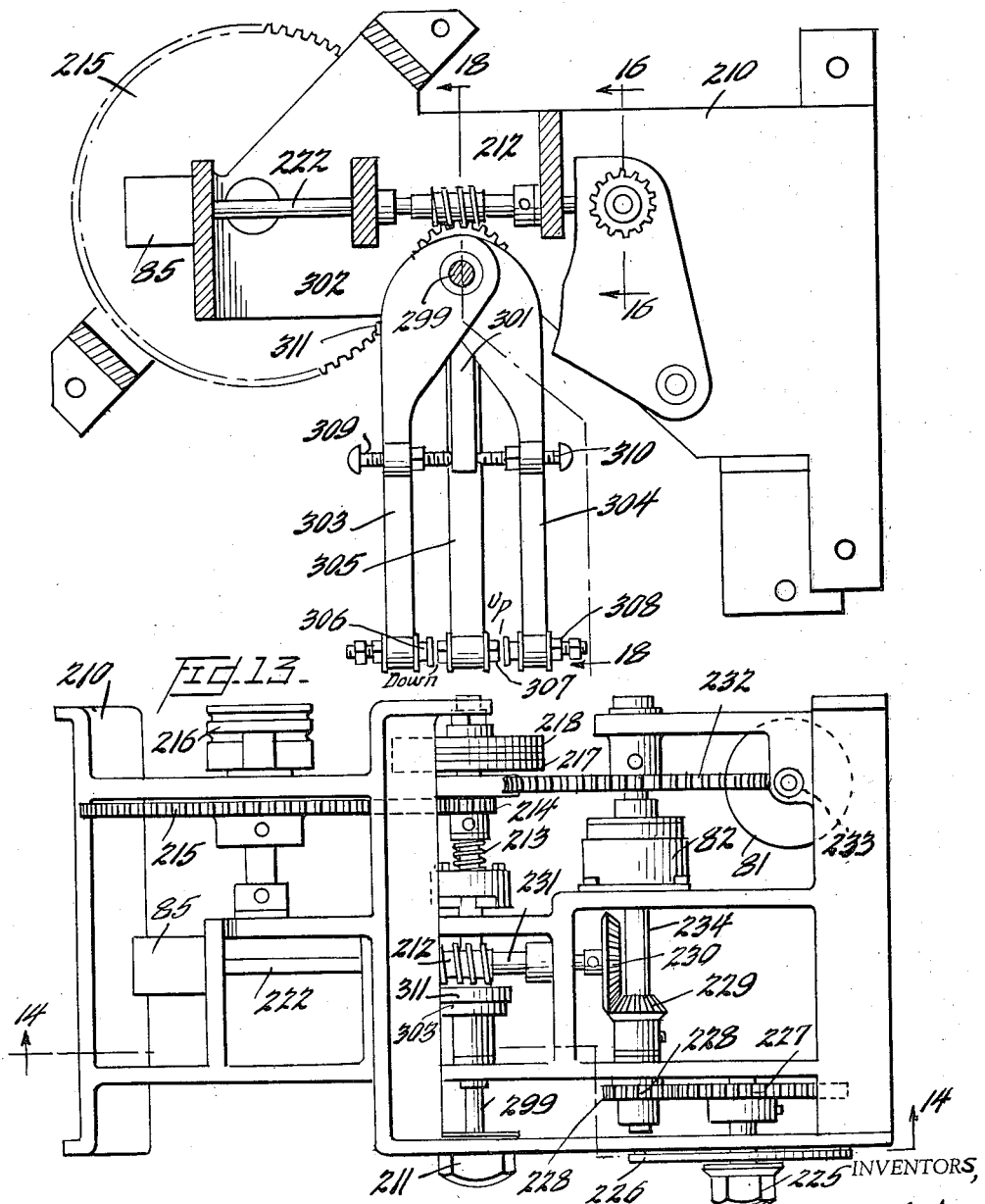

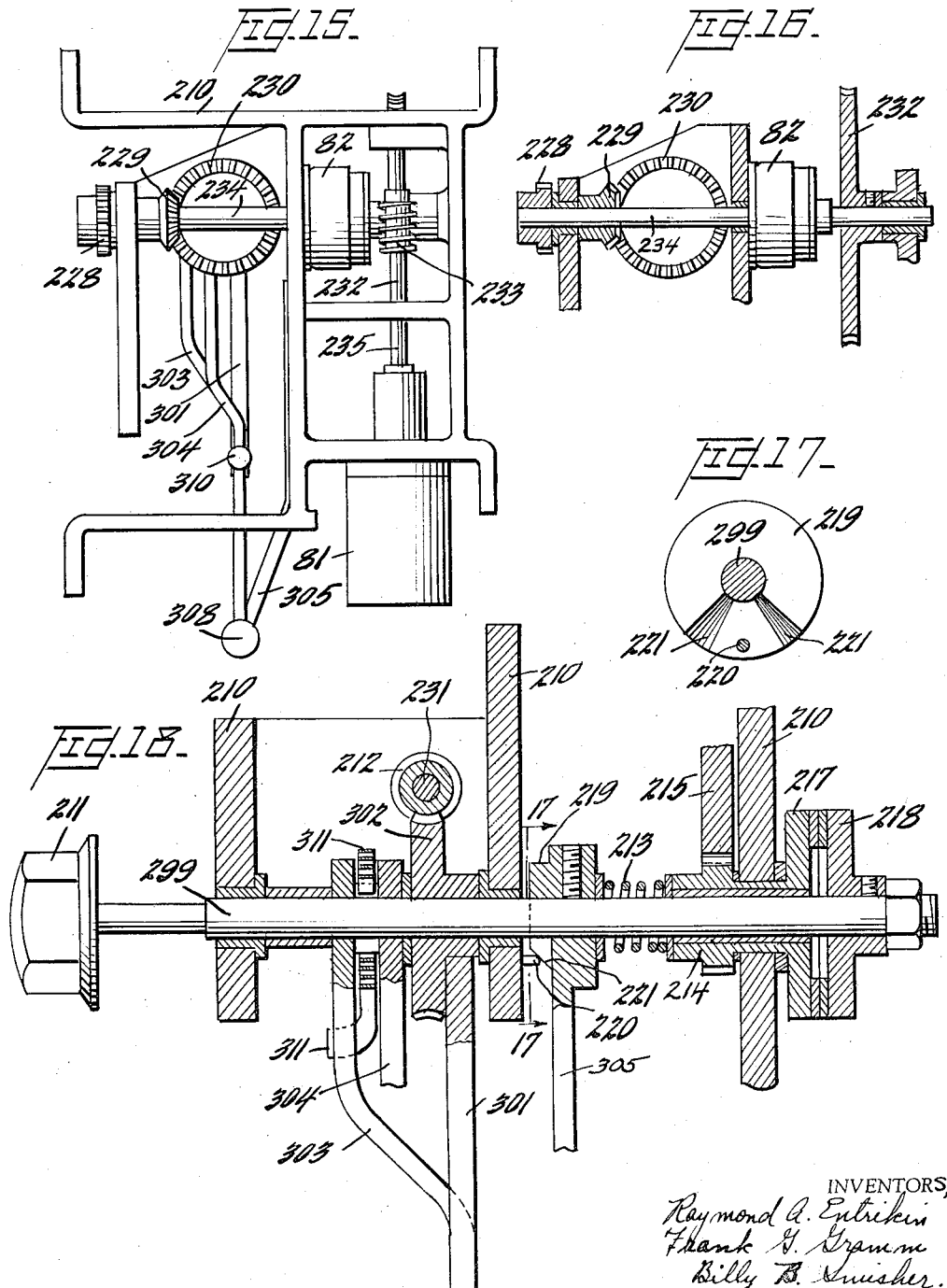

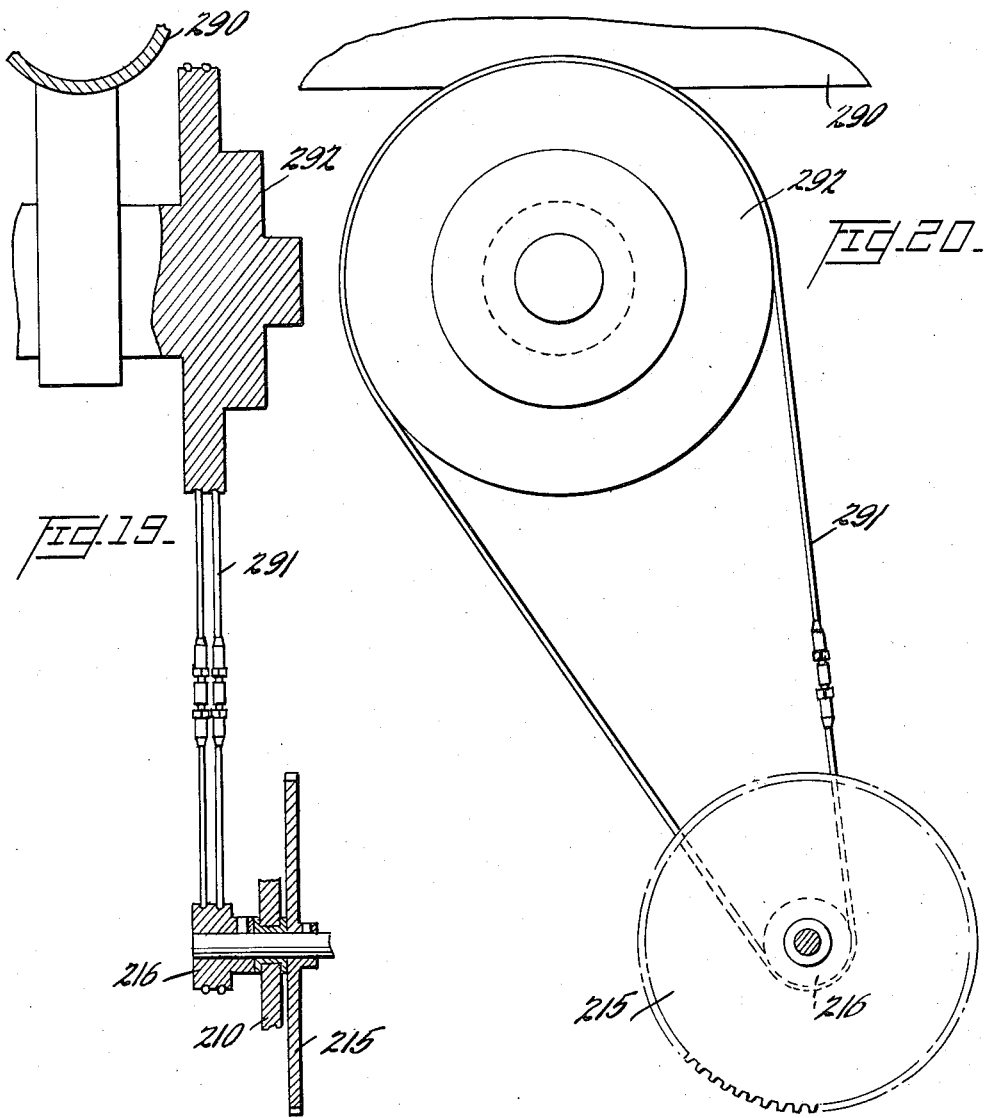

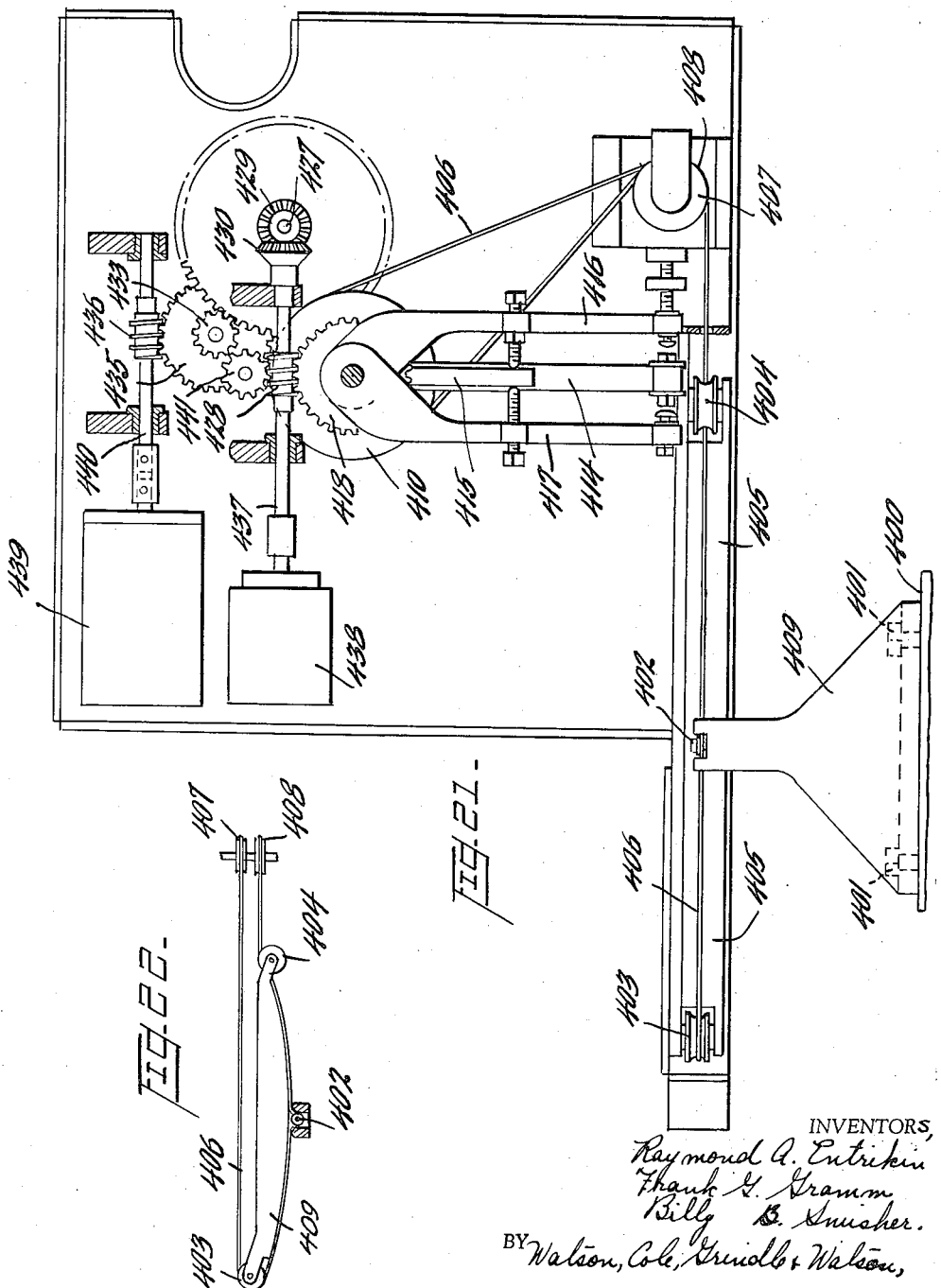

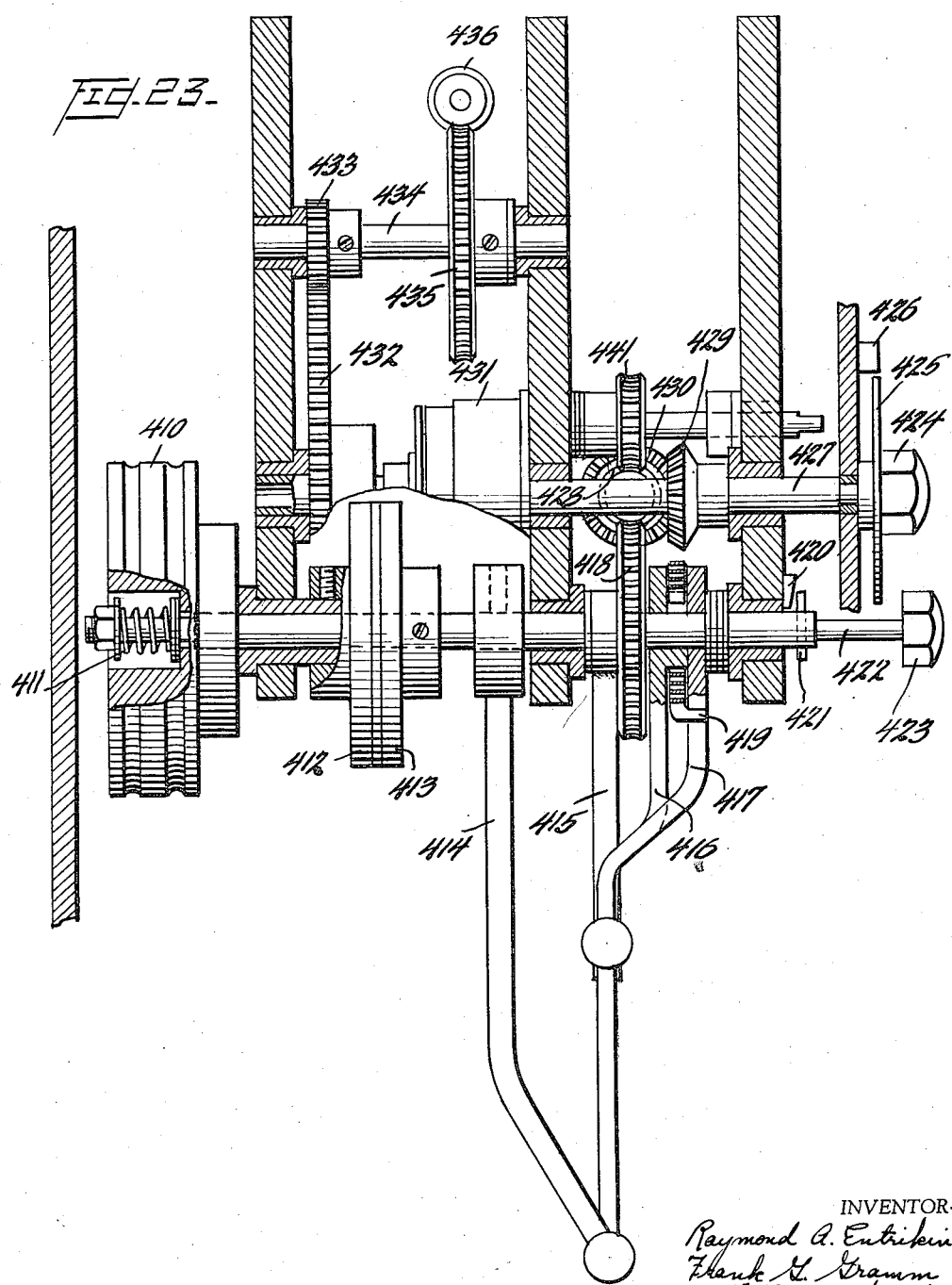

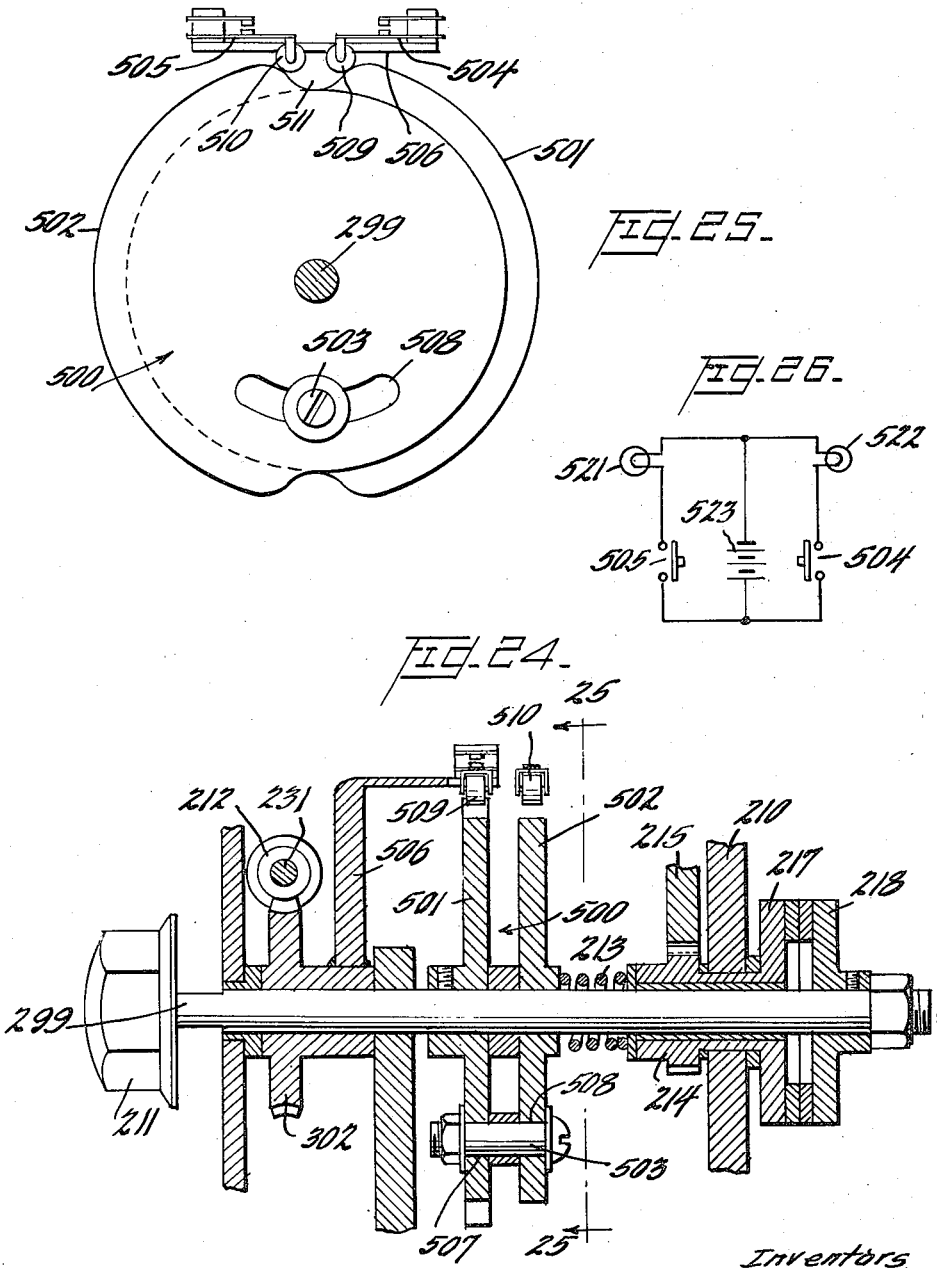

Raymond A. Entrikin, East Liverpool, Ohio, Frank G. Gramm, Beaver, Pa., and Billy B. Swisher, Chester, W. Va., assignors to Treadwell Construction Company, Midland, Pa., a corporation of Pennsylvania Application November 16, 1954, Serial No. 469,124

44 Claims. (Cl. 318—31)

This invention relates to new and improved apparatus for remotely controlling the operative position of a disstantly located device. The embodiment of the invention disclosed in detail herein is adapted for use with a rocket launcher whose launching positions are controlled from a remote point. From a generic aspect, however, it should be clearly understood that the novel principles of this invention are equally applicable to other types of installations wherein remote control is desired.

In the prior art, servo mechanisms employing electronic amplifiers and other delicate components have been used for the purpose of determining the range and azimuth settings for rocket launchers and other military equipment. It can be readily appreciated that due to the substantial shock accompanying the firing of projectiles, electronic units have in many instances operated unreliably. Metallic elements employed in vacuum tubes have a relatively low impact strength, and therefore these elements are easily susceptible to shattering. This latter disadvantage is particularly serious when the tubes are to be operated at the lower temperatures within the range of minus 65° to plus 125° F. usually required to fulfill military specifications. Other types of servo mechanisms such as, for example, hydraulic arrangements have been unsatisfactory for many military applications for the reason that extremely complicated designs have been required which have operated unreliably when subjected to wide variations in temperature and to the severe shock which is inherent in the launching of rockets and other missiles.

The principal objects of this invention are to provide a remote control which is extremely rugged and capable of operating reliably and accurately under severe conditions of shock, impact and temperature variations, relatively simple in construction thereby facilitating immediate repair in the event of inoperativeness, and economical to manufacture and maintain. In the main, the foregoing advantages are attained by an arrangement which completely eliminates the use of vacuum tubes and hydraulic mechanisms.

The remote control system of this invention, as applied to a rocket launcher, contemplates individual elevation and traverse receivers physically positioned on the launching carriage which may be mounted on a truck or the like. These receivers receive signals corresponding to the position of the launcher boom to remotely located elevation and traverse remote controls. Position command signals are generated by the remote control units and are compared in the receivers until the launcher boom or servo "slave" has attained the commanded position. In the event that only elevation or traverse control is desired only elevation or traverse units are required.

In a preferred mode of operation, the launching boom is initially positioned to the approximate desired elevation and traverse positions by the drive motor of the truck upon which the launching boom is mounted. An accurate setting to within plus or minus 20 mils of the required elevation and within plus or minus 100 mils of the required azimuth is then made by the conventional hand wheel usually provided in the truck type rocket launching stations. It is thereafter contemplated that the remote control of this invention will accurately establish the desired elevation and azimuth positioning of the launching boom to within a fraction of a single mil in both directions.

From weather data, etc., supplied from conventional sources, the final launcher position corrections are manually fed into the elevation and traverse remote controls by the launcher crew. Corresponding electrical signals are immediately transmitted to the elevation and traverse receivers positioned at the launching site. The requisite position correction is established within a relatively shorter period of time than that heretofore possible through the use of prior art arrangements.

For the purpose of general description, the structure of the elevation receiver and elevation remote control are hereinafter set forth. It should be understood, however, that corresponding structure is employed in the traverse controls and that its operation is substantially the same as that of the elevation controls.

The elevation receiver includes a highly calibrated micropot which is connected to a corresponding micropot positioned in the elevation remote control in such a manner that a conventional Wheatstone bridge is formed. The various positions of the movable contact arms of both micropots are calibrated in terms of angular measurement defining the range of control of the subject system; for example, plus or minus 20 mils in a preferred arrangement adapted for elevation control.

If the micropot positioned at the elevator receiver is zeroed, a null reading is indicated by a meter positioned at the elevation remote control when the micropot thereof is also positioned at zero. In the event, however, a correction in elevation of the launcher boom is desired, the micropot is appropriately manually adjusted to the required setting thereby unbalancing the bridge as indicated by a meter reading other than zero. The manual operation of the appropriate one of an up or down switch located at the elevation remote control energizes an alternating-current control motor located at the elevation receiver. The output shaft of the control motor is mechanically coupled to the movable contact arm of the micropot of the elevation receiver. Simultaneously with the movement of the micropot contact arm, the alternating-current control motor rotates a drive arm of a novel follow-up switch positioned in the elevation receiver. The movable tap and the drive arm are rotated by the control motor until such time as the Wheatstone bridge is balanced, and at which time the launcher operator releases the up or down control switch.

At the consummation of this operation, the receiver micropot and the drive arm of the follow-up switch have been set at new positions which correspond to the commanded elevation. The movement of the drive arm from its centered position effectuates the closure of an up or down contact carried by side contact arms which are part of the follow-up switch. This contact closure energizes the elevation drive motor for the launcher boom such that the boom is elevated or lowered as required. This motion of the launcher boom is transmitted to a follow-up contact arm of the follow-up switch in such a direction as to cause the follow-up contact arm to attain a position in axial alignment with the drive arm. When these arms are moved into alignment by the feed back of the launcher boom position, the contacts carried by the follow-up switch side arms are opened thereby de-energizing the elevation drive motor.

Military specifications relating to rocket launchers have heretofore specified that elevation control be provided through a range of 55° to 60°, and azimuth control through a range of 30°. Many prior art remote control arrangements employing servo mechanisms have been so designed that the control rendered thereby has been effective throughout the entire angular elevation and traverse ranges. These systems unfortunately have been unsatisfactory in many applications wherein precision positioning of the launcher boom is necessary. In these precision applications, military specifications usually require that the elevation of the boom be accurate to within plus or minus $\frac{1}{10}$ of a mil of the of the required positioning, and that the traverse position of the boom be accurate to plus or minus $\frac{1}{5}$ of a mil of the required positioning. Practical experience has shown that none of the prior art systems has been able to attain the goal of precision positioning and at the same time provide control over a broad range.

Accordingly, the previously described structure of this invention features a remote control system which is to operatively cooperate with conventional means for rough positioning the launcher boom within the required range of elevation and azimuth movements. A preferred embodiment of the remote control herein is capable of an accurate elevation positioning to within plus or minus $\frac{1}{10}$ mil after the launcher boom is initially positioned to within plus or minus 20 mils of the final setting. Likewise, the remote control is capable of a precision traverse positioning of the launcher boom to within plus or minus $\frac{1}{5}$ mil after the boom has been initially positioned to within plus or minus 100 mils of the final setting.

As previously set forth, elevation and traverse position follow-up switches are employed in the control of this invention to actuate the launcher drive motor in response to position command signals. In operation the position follow-up switch employed for elevation control translates the 40 mils elevation movement of the boom into 90 angular degrees of switch movement, and the position follow-up switch employed for traverse control translates 200 mils into 144 angular degrees of switch movement. The switches, together with their cooperating components, must operate with a high order of precision the switch contacts which energize the drive motor for the boom. Backlash or play in the system components cannot be tolerated because of the precision requirements. At the same time, the position follow-up switches must be capable of superimposing their narrow range precision control over the entire broad range of possible boom movements. This latter demanding requirement is attained herein by providing a novel cooperating clutch arrangement for each follow-up switch which effectively decouples the associated switch while the initial or rough positioning is effected, and thereafter couples the switch to the launcher boom to effect precision control.

A second preferred species of the switch employed in the structure of this invention features a plurality of discs adjustably and fixedly coupled one to the other. Each of these discs is arranged to operate as an actuating cam for an associated follower roller and contact. The cam contours of the discs so vary that angular movement of the pair relative to the associated contacts may either close one or the other of said contacts or cause both contacts to remain open.

An arm which supports the contacts is mechanically coupled to the adjusting mechanism which provides for the establishment of a command position, and the coupled disc pair is coupled to the rocket launcher boom so that the rotational movements of the boom are amplified and transmitted to the discs. The rotational movements of the launcher boom are amplified by the second form of position follow-up switch in a manner which corresponds to that previously described so as to effect the requisite positioning of the launcher boom. This second form of switch, however, possesses certain advantages in that it enables the receiver control units to be greatly reduced in size, and also greatly simplifies the techniques required to construct the follow-up switch.

The cooperation of a conventional Wheatstone bridge in association with the novel follow-up switch of this invention as mechanically coupled to a rocket launcher boom provides precision control of the boom reliably and quickly. This mode of advantageous operation is necessary to enable many weapons which are excellent per se to function as practical tactical weapons.

In order that all of the structural features for attaining the objects of this invention may be readily understood, reference is herein made to the drawings wherein:

Figure 1 is a diagram of assistance showing the manner in which the drawing sheets embodying Figures 2, 3 and 4 must be combined in order to show a complete schematic diagram of the electrical circuitry of the remote control of this invention;

Figure 2 is a portion of the schematic circuitry of the remote control of this invention including the elevation and traverse remote controls;

Figure 3 is a portion of the schematic circuitry of this invention showing the boom drive motors and the connections to the drive and control motor relays;

Figure 4 is a portion of the schematic circuitry of this invention showing in detail the elevation and traverse receivers;

Figure 5 is an elevation view of the novel position follow-up switch of this invention in the centered or zero position;

Figure 6 is an elevation view of the follow-up switch of Figure 5 showing the drive arm thereof in a position attained in response to a commanded downward elevation setting;

Figure 7 is an elevation view of the center follow-up contact arm of the follow-up switch of Figure 5;

Figure 8 is an elevation view of the up side-contact arm of the follow-up switch of Figure 5;

Figure 9 is a sectional view showing in detail the contact assemblies for the follow-up switch of Figure 5;

Figure 10 is an elevation view of the spring employed in the follow-up switch of Figure 5;

Figure 11 is a side elevation view of the drive arm and the worm wheel thereof employed in the follow-up switch of Figure 5;

Figure 12 is a front elevation view of the drive arm and worm wheel thereof employed in the follow-up switch of Figure 5;

Figure 13 is a simplified plan view of the mechanical structure employed in the elevation receiver to appropriately integrate the functions of the follow-up switch and receiver micropot in accordance with the commanded elevation position and the feed-back launcher boom position;

Figure 14 is a simplified view taken along lines 14—14 of Figure 13 and showing in elevation a centered or zeroed follow-up switch;

Figure 15 is a right end view of the structure shown in Figure 14 and showing in detail a side view of the follow-up switch and the control motor attachments;

Figure 16 is a detail sectional view taken along the lines 16—16 of Figure 14;

Figure 17 is a plan view of a beveled cam associated with the driving shaft for the follow-up switch so as to properly limit the switch arm movements;

Figure 18 is a sectional view taken along line 18—18 of Figure 14;

Figure 19 is a side elevational view partly in section showing the cable structure for feeding back the launcher boom position to the receiver structure shown in Figures 13 through 18.

Figure 20 is an elevational view of the structure shown in Figure 19;

Figure 21 is a simplified developed view showing the modifications required to adapt the mechanical elevation receiver structure shown in Figures 13 through 20 for azimuth control;

Figure 22 is a plan view showing the guide pulleys and bracket for the azimuth control cable;

Figure 23 is a detailed developed view partly in section of the structure of Figure 21;

Figure 24 is a sectional view corresponding to Figure 18 modified to incorporate an alternative preferred follow-up switch structure;

Figure 25 is a view taken along lines 25—25 shown in Figure 24; and

Figure 26 is a schematic circuit diagram of an electrical circuit employed with the mechanical receiver structure to provide an on-target indicator.

The complete schematic diagram of the electrical circuitry of this invention is shown in Figures 2, 3 and 4 when combined in accordance with the diagram of assistance of Figure 1. In the main, the components of Figures 3 and 4 are located at the rocket launching station which may be a truck or the like, and the components of Figure 2 are remotely located from the launching station by the necessary distance to protect the launching crew from shock. This distance in regard to the launcher may be 300 feet. The system would operate just as satisfactorily at greater distances, however.

Elevation remote control 20 and traverse remote control 200 are manually operated to establish the required elevation and traverse command signals for the remotely located launcher boom, and elevation drive motor 107 and traverse drive motor 201 are mechanically coupled to the launcher boom so as to effect the appropriate commanded movement thereof. Elevation receiver 203 and traverse receiver 202 translate the position of the launcher boom into appropriate electrical signals whereby an electrical comparison of the commanded and the actual position of the launcher boom can be effected by the novel servo loop arrangement of this invention. When the commanded and the actual position of the boom coincide the system is closed down, and the rocket may be accurately and safely launched from a point remote from the launching station.

The circuitry for effectuating elevation control is essentially duplicated to provide traverse control. The traverse control components, namely, traverse remote control 200, traverse drive motor 201, relays $R_3$ and $R_4$, and traverse transmitter 202 are electrically multipled into the elevation control circuitry in such manner as to utilize common power supplies and common conductors wherever possible. Accordingly, only the detailed operation of elevation control is set forth herein, the circuit operation in the event of traverse control being identical. Similar electrical connections are noted by the same numbers, except in the instance of the traverse control circuit, these numbers are prime.

Micropot 22 positioned within elevation remote control 20 is connected to micropot 85 positioned within the elevation receiver 203 such that a conventional Wheatstone bridge is formed. In particular, the left terminal of micropot 22 is connected to the right terminal of micropot 85 through conductor 48, and the right terminal of micropot 22 is connected to the left terminal of micropot 85 through conductor 46. The movable tap of micropot 22 is connected to the movable tap of micropot 85 through conductor 24, meter 21, conductor 27, conductor 25, the lower tapped portion of rheostat 23, and cable conductor 47 to the movable tap of micropot 85. Push-button switch 28 when closed shunts the lower-tapped portion of rheostat 23 whereby increased sensitivity of meter readings 21 can be attained when the bridge is near balance as indicated by a reading substantially close to zero. The energizing potential for the bridge is supplied at terminals 123 and 125 by the 24 volt direct-current source through sections $a$ and $b$ of master switch 108 and conductors 100 and 101.

Up control switch 32 and down control switch 33 are connected to the associated energizing coils for control motor relay $R_2$ in such a manner that the individual energization of different ones of these coils controls the starting and the direction of rotation of control motor 81.

In particular, the closure of up switch 32 causes the 24 volt direct-current source to energize the up coil of relay $R_2$ by current flow from the plus terminal through section $a$ of master switch 108, conductor 100, terminal 127, conductor 45, contact $a$ of down switch 33, contact $b$ of up switch 32, conductor 40, up coil of relay $R_2$, conductor 171, terminal 130, conductor 101, and contact $b$ of master switch 108 to the negative terminal of the 24 volt direct-current source.

The closure of down switch 33 causes the 24 volt direct-current source to energize the down coil of relay $R_2$ by current flow from the plus terminal through contact $a$ of master switch 108, conductor 100, terminal 127, conductor 45, contact $a$ of up switch 32, contact $b$ of down switch 33, conductor 41, down coil of relay $R_2$, conductor 171, terminal 130, conductor 101, and contact $b$ of master switch 108 to the negative terminal of the 24 volt direct-current source.

The energization of the up coil of relay $R_2$ causes the 110 volt alternating-current source to operate A. C. motor 81 in a first direction of rotation by current flow in a circuit including the ground terminal, contact $b$ of master switch 108, conductor 101, terminal 126, conductor 42, terminal 98, conductor 99, armature winding of motor 81, conductor 61, up contact $b$ of relay $R_2$, conductor 166, terminal 165, conductor 62, series motor winding 80, conductor 63, terminal 164, up contact $c$ of relay $R_2$, conductor 173, terminal 128, conductor 102 through contact $c$ of master switch 108 to the lower terminal of the 110 volt alternating-current source.

When the down coil of relay $R_2$ is energized in response to the closure of down switch 33, the serial connection of series winding 80 with respect to the armature winding of motor 81 is reversed thereby reversing the direction of rotation of motor 81. Current flow in this instance flows in a circuit including the ground terminal, contact $b$ of master switch 108, conductor 101, terminal 126, conductor 42, terminal 98, armature winding of motor 81, conductor 61, down contact $b$ of relay $R_2$, conductor 174, terminal 164, conductor 63, series motor winding 80, conductor 62, terminal 165, conductor 167, down contact $c$ of relay $R_2$, conductor 173, terminal 128, conductor 102 through contact $c$ of master switch 108 to the lower terminal of the 110 volt alternating-current source.

Magnetic clutch 82 is separately energized by the 24 volt direct-current source simultaneously with the operation of A. C. motor 81 by current flow from the plus terminal of the direct-current source through contact $a$ of master switch 108, conductor 100, terminal 169, conductor 168, either up or down contact $a$ of relay $R_2$, conductor 60, rheostat 83, the winding of magnetic clutch 82, conductor 99, terminal 98, conductor 42, terminal 126, through contact $b$ of master switch 108 to the negative terminal of the 24 volt direct-current source. Clutch 82 is part of a mechanical coupling arrangement which applies drive power from A. C. motor 81 to the movable tap of micropot 85, and to position indicator switch 300. The mechanical details of the coupling structure incorporating clutch 82 will be described in detail hereinafter.

The resulting adjustment of the movable tap of micropot 85 balances the Wheatstone bridge circuitry previously described as is indicated by a null reading at meter 21. For example, during the initial zeroing of the remote control of this invention and prior to the transmission of a commanded elevation, micropots 22 and 85 are so adjusted as to balance the Wheatstone bridge. Any subsequent manual movement of the movable tap of micropot 22 will unbalance the bridge as is indicated by signal reading at meter 21. Both micropots 22 and 85 are calibrated in terms of angular elevation, and the subsequent operation of either up switch 32 or down switch 33 in correspondence with either an up or down elevation adjustment at micropot 22 will establish the appropriate energization of the up or down coil of relay $R_2$ such that motor 81 will be energized. The drive power of motor 81 as coupled to the movable tap of micropot 85 is in such a direction as to cause a balancing of the Wheatstone bridge for the commanded elevation setting of micropot 22. The up switch 32 or the down switch 33 is manually operated until a null reading is obtained at meter 21 at which time the switch is released thereby de-energizing motor 81.

The drive power of energized motor 81 is coupled to position follow-up switch 300 in such a manner as to appropriately close the up or down contacts thereof to establish energizing circuitry for elevation drive motor 107 at the appropriate times whereby the elevation setting of the launcher boom is driven to the commanding elevation position. Elevation drive motor 107 is accordingly energized for a sufficient interval to effectuate the elevation movement of the launcher boom to the commanded position. When this is attained, the connection of conductor 91 to either conductor 90 or 92 through follow-up switch 300 is opened, thereby de-energizing elevation drive motor 107 and terminating further movement of the launcher boom.

The mechanical details of follow-up switch 300 are best shown in Figures 5 through 12. The switch is assembled with respect to shaft 299, and comprises a drive arm 301 which is loosely coupled to shaft 299 through the collar of worm wheel 302. The output of control motor 81 is coupled to worm wheel 302 by structure which will be described in detail hereinafter in such a manner as to drive arm 301 in either direction depending upon the particular up or down energization of motor 81. Side contact arms 303 and 304 are loosely positioned upon shaft 299, and the terminal ends of spring 311 are coupled to side contact arms 303 and 304 such that set screws 309 and 310 forcibly contact opposite sides of drive arm 301 as is shown in Figure 5. A flange is provided at one end of spring 311 to direct a counterclockwise spring force to contact arm 303, and a second flange is provided at the other terminal end of spring 311 which mates with slot 312 positioned in collar 313 of contact arm 304 to direct a clockwise spring force to contact arm 304.

Follow-up contact arm 305 is rigidly coupled to shaft 299 and rotates in accordance with the movements of this shaft. The lower terminal portions of contact arms 303, 304 and 305 are provided with assemblies which form contacts 306, 308 and 307, respectively. As is shown in the detailed sectional views of Figure 9, contacts 306, 307 and 308 are electrically insulated from the associated contact arms by means of insulation assemblies 314, 315 and 316, respectively.

When follow-up switch 300 is in the zero position shown in Figure 5, set screws 309 and 310 are adjusted with respect to drive arm 301 so that contact 307 is spaced from contacts 306 and 308 by intervening gaps whereby conductor 91 is prevented from making electrical connection with conductors 90 and 92. In the event, for example, control motor 81 is energized in response to the manual closure of down switch 33, drive arm 301 is rotated in a counterclockwise direction from the zero position to that shown in Figure 6. Inasmuch as set screw 310 contacts drive arm 301, side contact arm 304 is carried and rotated by drive arm 301. Drive arm 301 also moves away from set screw 309 of contact 303 thereby permitting spring 311 to close the gap between contacts 306 and 307. Further counterclockwise movement of contact arm 303 is not permitted for the reason that center contact arm 305 is rigidly coupled to heavily loaded shaft 299. The contact closure electrically interconnects conductors 90 and 91 whereby a down energizing circuit for drive motor 107 is established.

The downward movement of the launcher boom effected by drive motor 107 is coupled to follow-up contact arm 305 by structure which will be described in detail hereinafter. This structure rotates shaft 299 in a counterclockwise direction thereby carrying and rotating arm 305 in a corresponding direction. Spring 311 causes side contact arm 303 to follow center contact arm 305 thereby maintaining closure of the gap between contacts 306 and 307. When follow-up contact arm 305 is driven into alignment position with the now stationary drive arm 301, set screw 309 contacts the left side of drive arm 301 thereby re-establishing the gap between contacts 306 and 307 and opening the energizing circuit for drive elevation motor 107. With this operation, no further rotational force is applied to follow-up contact arm 305 thereby maintaining elevation drive motor 107 in a de-energized condition.

The energization of elevation drive motor 107 in response to the closure of down contact combination 306—307 is as follows: Initially, the down coil of drive motor relay $R_1$ is energized by a circuit including the negative terminal of the 24 volt direct-current source, contact $b$ of master switch 108, conductor 101, conductor 146, down coil of relay $R_1$, conductor 163, terminal 160, conductor 43, conductor 95, closed contact $c$ of interlock switch 84, conductor 93, conductor 90, closed down contact of follow-up switch 300, conductor 91, conductor 45, terminal 127, conductor 100, and contact $a$ to the positive terminal of the 24 volt direct-current source.

The energization of the down coil of relay $R_1$ closes the associated relay contacts, and elevation drive motor 107 is energized by current flow in a circuit including the negative terminal of the 110 volt alternating-current source, contact $b$ of master switch 108, conductor 101, terminal 130, terminal 129, conductor 103, running coil of drive motor 107, conductor 105, closed down contact $b$ of relay $R_1$, terminal 140, conductor 106, starting coil of motor 107, conductor 104, terminal 141, conductor 144, contact $c$ of relay $R_1$, conductor 145, conductor 102, and through contact $c$ of master switch 108 of the lower terminal of the 110 volt alternating-current source.

When control motor 81 is energized in response to the manual closure of up switch 32, drive arm 301 is rotated in a clockwise direction from the zero position of Figure 5. In this instance contact arm 303 is carried by drive arm 301 and the gap between contacts 307 and 308 is closed, thereby energizing drive motor 107 until follow-up contact arm 305 is moved into alignment position with the drive arm.

The energization of elevation drive motor 107 in response to the closure of the up contact combination 307—308 is as follows: Initially, the up coil of drive motor relay $R_1$ is energized by a circuit including the negative terminal of the 24 volt direct-current source, contact $b$ of master switch 108, conductor 101, conductor 146, up coil of relay $R_1$, conductor 162, terminal 161, conductor 44, conductor 96, closed contact $b$ of interlock switch 84, conductor 94, conductor 92, closed up contact of follow-up switch 300, conductor 91, conductor 45, terminal 127, conductor 100, and contact $a$ of master switch 108 to the positive terminal of the 24 volt direct-current source.

The energization of the up coil of relay $R_1$ closes the associated relay contacts, and elevation drive motor 107 is energized by current flow in a circuit including the negative terminal of the 110 volt alternating-current source, contact $b$ of master switch 108, conductor 101, terminal 130, terminal 129, conductor 103, running coil of motor 107, conductor 105, closed up contact $b$ of relay $R_1$, conductor 143, terminal 141, conductor 104, starting coil of motor 107, conductor 106, terminal 140, conductor 142, closed up contact $c$ of relay $R_1$, conductor 145, and conductor 102 through contact $c$ of master switch 108 to the lower terminal of the 110 volt alternating-current source.

It will be noted from the foregoing description that alternate closure of the up or down set of contacts on relay $R_1$ merely reverses the serial connection of the running coil of elevation drive motor 107 with respect to the starting coil.

The closure of either the up or down contacts of follow-up switch 300 is monitored at the remote control by up or down lamps 30 and 31, respectively. The circuitry for energizing these lamps in association with follow-up switch 300 is as follows. The center common terminals of both of the lamps are connected to the negative terminal of the 24 volt direct-current source through conductor 42, terminal 126, conductor 101 and contact b of master switch 108. The positive terminal of the 24 volt direct-current source is connected to the left terminal of lamp 30 through contact a of master switch 108, conductor 100, terminal 127, conductor 45, conductor 91, closed up contact of follow-up switch 300, conductor 92, conductor 94, contact b of interlock switch 84, conductor 96, and conductor 44 to the left terminal of lamp 30. The positive terminal of the 24 volt direct-current source is connected to the right terminal of lamp 31 through contact a of master switch 108, conductor 100, terminal 127, conductor 45, conductor 91, closed down contact of follow-up switch 300, conductor 90, conductor 93, contact c of interlock switch 84, conductor 95, and conductor 43 to the right terminal of indicator lamp 31.

The closure of up switch 88 or down switch 89 completes the energizing circuits for the up or down coils of relay $R_1$ when interlock switch 84 is in the open position shown in Figure 4. This switch operation simulates contact closure in follow-up switch 300 whereby drive motor 107 may be energized directly from elevation receiver 203.

Up switch 88 energizes the up coil of relay $R_1$ by a circuit including the positive terminal of the 24 volt direct-current source, contact a of master switch 108, conductor 100, terminal 127, conductor 45, conductor 97, contact a of interlock switch 84, closed upper contacts of down switch 89, closed lower contacts of up switch 88, conductor 44, terminal 161, conductor 162, up coil of relay $R_1$, conductor 146, conductor 101, contact b of master switch 108 to negative terminal of the 24 volt direct-current source.

Down switch 89 energizes the down coil of relay $R_1$ by a circuit including the positive terminal of the 24 volt direct-current source, contact a of master switch 108, conductor 100, terminal 127, conductor 45, conductor 97, contact a of interlock switch 84, closed upper contacts of up switch 88, closed lower contacts of down switch 89, conductor 43, terminal 160, conductor 163, down coil of relay $R_1$, conductor 146, conductor 101, contact b of master switch 108 to negative terminal of the 24 volt direct-current source.

The mechanical structure for driving the arms of follow-up switch 300 and micropot 85 by control motor 81 and the feedback movements of the rocket launcher boom is shown in detail in Figures 13 through 20. The manual rotational movement of zeroing knob 225 is coupled to micropot 85 and also to drive arm 301 of indicator switch 300. As will be explained hereinafter in detail, in the initial adjustments of the elevation receiver both micropot 85 and drive arm 301 must be set at a position indicative of the "zero" elevation. This elevation is the elevation position from which remote control is initiated by manual adjustment of elevation control 20, and is not necessarily actual zero elevation. Rotational movement of knob 225 is transmitted to micropot 85 by gear 227 through pinion gear 228, bevel gear pair 229 and 230, shaft 231, and shaft 222 to the movable arm of micropot 85. The rotational movement of shaft 231 is also transmitted to worm 212 which meshes with worm wheel 302 thereby actuating drive arm 301 of indicating switch 300. Dial plate 226 is calibrated in terms of plus or minus mils of elevation and is rigidly supported by frame 210 whereby the relative adjustment position of a pointer on knob 225 can be established.

The rotation of bevel gear 229 is not coupled to worm wheel 232 during all periods of time wherein the intervening magnetic clutch 82 is de-energized. Accordingly, the rotation of knob 225 does not produce a rotation of worm 233 which is required to rotate motor 81 through shaft 235. Likewise, the rotation of motor 81 is not coupled to shaft 234 unless magnetic clutch 82 is energized.

The manual adjustment of control knob 211 provides the requisite alignment of center arm 305 with respect to drive arm 301 required in the initial zeroing adjustment of follow-up switch 300. This zeroing adjustment is accomplished by pressing in knob 211 whereby clutch plate 218 which is rigidly attached to shaft 299 is disengaged from clutch plate 217. With this de-clutching operation, knob 211 is rotated in the appropriate direction and the corresponding rotation of shaft 299 moves center arm 305. When center arm 305 is moved into alignment position with drive arm 301, both of the up and down lamps 86 and 87 positioned within the elevation receiver box 203 are de-energized, thereby rendering a visual indication of the mechanical zeroing of follow-up switch 300. Both lamps 86 and 87 are de-energized when follow-up switch 300 is zeroed for the reason that the energizing circuits for these lamps include the down and up contacts of the follow-up switch. These contacts are in open condition when follow-up switch 300 is zeroed and therefore a closed circuit for the lamps cannot be established.

The de-clutching of plate 218 from 217 disengages pulley 216 and its associated load from shaft 299, because pinion gear 214, clutch plate 217 and gear 215 are no longer mechanically coupled to shaft 299. The removal of pulley 216 and its load from shaft 299 during the zeroing of center arm 305 of follow-up switch 300 is required for the reason that movement of shaft 299 during zeroing would be prevented by heavily loaded gear 215.

The rotational movement of pulley 216 which is coupled elevation-wise with rocket launcher boom 290 through cable 291 and trunion 292 is transmitted to follow-up contact arm 305 at the appropriate times through gear 215, pinion gear 214, engaged clutch plates 217 and 218, and shaft 299 to center arm 305. In the event the rotational motion transmitted thusly from gear 215 exceeds the movement limits for the side contact arms 303 and 304 of indicator switch 300, the bevel cam surfaces 221 of bevel cam plate 219 are contacted by pin 220 which is supported by frame 210, whereby spring 213 is compressed disengaging clutch plates 217 and 218. With this operation further rotational movement transmitted by gear 215 is ineffective to move the arms of follow-up switch 300.

The detailed operation of the remote control of this invention to effectuate elevation positioning is as follows: initially, the truck or the like upon which the rocket launcher is located is driven to the desired launching location. At this time, master switch 108 is open, consequently, the 24 volt direct-current source and the 110 volt alternating-current source are isolated from the circuitry. The cover for the housing of elevation receiver 203 is closed while the truck or the like is being driven to location so as to protect the internal components. The closure of this cover actuates interlock switch 84 so that contacts b and c thereof are closed. This particular contact closure is ineffectual at this time to produce any circuit operation for the reason that master switch 108 is open.

When the launcher truck is in position the rocket is then placed in the launcher. A preliminary or rough elevation setting for the launcher boom is then established by the conventional hand wheel arrangements heretofore employed on rocket launcher trucks. As an alternative, however, the appropriate up or down switches 88 or 89 of elevation receiver 203 may be operated after master switch 108 is closed to energize elevation drive motor 107 whereby manual hand wheel operation can be avoided. Switches 88 and 89 may be manually operated only when the housing cover for elevation receiver 203 is open. Accordingly, the energizing circuits for elevation drive motor 107 are completed at this time because interlock switch 84 is in its open position or the position shown in Figure 4 of the drawings. The closure of either of the up or down switches 88 or 89 energizes the appropriate up or down coil of relay $R_1$ whereby the energizing circuits for elevation drive motor are established as previously set forth.

The movement of the launcher boom during the preliminary adjustment is transmitted by cable to pulley 216, gear 215, pinion gear 214, clutch plates 217 and 218, shaft 299 to the center arm 305 of follow-up switch 300. In the event the preliminary movement of the launcher boom which is transmitted to shaft 299 and ultimately to center contact arm 305 exceeds the permissible movement limits for follow-up switch 300, side contact arms 303 and 304 are not forced beyond these limits because the bevel surfaces 221 of bevel cam plate 219 are contacted by pin 220. This contact operation compresses spring 213 thereby de-clutching plate 218 from plate 217 and isolating further movements of the rocket launcher boom from shaft 299 and the follow-up switch.

After the preliminary elevation position of the launcher boom has been established, the housing cover for elevation receiver 203 is raised, if not already in this position, thereby opening interlock switch 84 to the position shown in Figure 4. Master switch 108 is closed thereby energizing the remote control circuitry. Thereafter micropot 85 is zeroed with respect to the elevation readings appearing on stationary dial plate 226. That is, knob 225 is rotated until the pointer thereof corresponds with the zero marking on dial plate 226. The rotation of knob 225 is transmitted through gear 227, pinion gear 228, bevel gear pair 229 and 230, shaft 231, and shaft 222 to micropot 85 whereby the movable arm thereof is positioned to the center resistance point.

The rotational movement of shaft 231 is transmitted through worm 212 to worm wheel 302 thereby centering drive arm 301 of follow-up switch 300. During the zeroing of micropot 85 and the centering of drive arm 301 of the follow-up switch, magnetic clutch 82 is de-energized thereby permitting the easy rotation of shaft 234.

The centering of drive arm 301 in all probability is attained at a position whereat the drive arm 301 is out of alignment with center contact arm 305. Consequently, spring 311 will force one or the other of side contact arms 303 or 304 to close the intervening contact gap with respect to contact 307 carried by center arm 305. This contact closure does not energize drive motor relay $R_1$ for the reason that interlock switch 84 is in the open position at this time. However, it is necessary before remote operation is effected that the center arm be zeroed or placed into alignment position with the zeroed drive arm 301. Accordingly, knob 211 is pressed in and rotated thereby disengaging clutch plate 218 from clutch plate 217 and permitting the rotation of shaft 299 to produce a corresponding movement in the center contact arm 305. When center contact arm 305 is moved into alignment with drive arm 301, the previously energized up or down lamp 86 or 87 is de-energized thereby rendering a visual indication of the zeroing of follow-up switch 300.

The housing cover for elevation transmitter 203 is then closed thereby closing contacts $b$ and $c$ of interlock switch 84. The control of this invention is then in readiness for remote operation. If the movable arm of micropot 22 is centered at zero, the Wheatstone bridge is in balance and a null reading is obtained at meter 21. After the required elevation adjustment has been computed, the movable arm of micropot 22 is manually moved from the zero position to a position which corresponds to the required change from the preliminary elevation adjustment. This movement of the movable arm of micropot 22 unbalances the bridge and a signal reading is rendered by meter 21. The appropriate up or down switch 32 or 33 is closed thereby energizing control motor 81 and magnetic clutch 82. The output drive of motor 81 is coupled to the movable tap of micropot 85 through worm 233, worm wheel 232, energized clutch 82, shaft 234, bevel gear pair 229 and 230, shaft 231, shaft 222 to micropot 85. The resulting movement of the movable tap of micropot 85 is in such a direction as to balance the Wheatstone bridge. Accordingly, the signal readings of meter 21 are towards zero. Fine adjustment is made when meter 21 indicates approximate balance by depressing switch 28. When meter 21 indicates zero, the appropriate up or down switch 32 or 33 is released thereby de-energizing motor 81 and clutch 82.

The rotation of worm 212 in response to the rotation of motor 81, drives worm wheel 302 whereby drive arm 301 is moved from the zero position to a new position defined by the commanded elevation setting at remote control 20. Accordingly, spring 311 effectuates the closure of the appropriate down or up contact of follow-up switch 300 and the corresponding down or up coil of relay $R_1$ is energized. The closure of the down or up contacts of relay $R_1$ completes the energizing circuits for elevation drive motor 107. With this operation elevation drive motor 107 moves the launcher boom to the commanded position. The resulting movement of the launcher boom is fed back by cable connections to pulley 216 and through gear 215, pinion 214, engaged clutch plates 217 and 218 to the center contact arm 305 of indicator switch 300. This motion feed back operation continues until center contact arm 305 is driven into alignment with drive arm 301, at which time the previously closed up or down contact of follow-up switch 300 is opened thereby de-energizing motor 107. The attainment of the commanded elevation position by the rocket launcher boom is visually indicated by the de-energization of the previously energized up or down lamp 30 or 31.

With the following operation the rocket launcher boom has been remotely elevated accurately to the commanded and desired position and the rocket may be launched at the appropriate time.

As was previously set forth, the circuitry for effecting azimuth remote control is identical in all material particulars to that previously described for effecting elevation remote control. However, inasmuch as azimuth receiver 202 is advantageously located upon the rocket launcher carriage and will therefore rotate therewith, some modification of the mechanical structure of the elevation is necessary to adapt it for use with the azimuth transmitter. Developed views of the mechanical structure embodied within azimuth receiver 202 are shown in Figures 21 through 23. Bracket 409 is mechanically coupled to a stationary portion 400 of the rocket launcher truck by means of bolts 401. Bolt 402 coupled to bracket 409 fixedly anchors cable 406. The remaining structure of these views is housed and positioned upon the rocket launcher carriage and moves in accordance with the azimuth position of the launcher boom.

Cable 406 moves over pulleys 403, 404, 407 and 408 thereby driving pulley 410 in accordance with the azimuth position of the carriage. Curve guide piece 405 is so shaped and positioned as to maintain cable 406 taut so as to eliminate any loss of transmitted angular motion. Pulley 410, therefore, rotates proportionately with the azimuth movement of the rocket launcher carriage.

It will be recalled with respect to the description regarding elevation follow-up switch 300 and elevation micropot 85, that a zeroing of the movable arm of the micropot and centering of the drive arm of the follow-up switch are required prior to the setting up of a remote control. Similarly, micropot 438 and drive arm 415 of the azimuth follow-up switch must be zeroed and centered prior to the establishment of azimuth control. The movable arm of micropot 433 is centered by manually turning knob 424 and its accompanying movable dial 425 until the zero reading is indicated by stationary marker 426. This operation rotatably moves shaft 427, bevel gears 429 and 430, shaft 437 and ultimately the movable arm of micropot 438. The rotation of shaft 437 also drives worm 428 which is coupled to worm wheel 418 of drive arm 415 thereby simultaneously centering the drive arm with the zeroing of the movable arm of the micropot.

Center follow-up contact arm 414 is moved into center alignment with drive arm 415 by manually pulling knob 423 outwardly thereby compressing spring 411 and disengaging clutch plate 413 from clutch plate 412 and rotatably moving shaft 422. The rotatable movement of shaft 422 is accompanied by corresponding movement of center arm 414. When arm 414 is in alignment with drive arm 415, left and right lamps 451 and 452 are both off thereby rendering a visual indication of the centering of the azimuth follow-up switch.

Excess angular rotation of shaft 422 beyond the permissible limits of the side arms 416 and 417 in response to the preliminary or rough azimuth adjustment is prevented by the engagement of pin 421 upon cam surfaces of bevel washer 420. The engagement of pin 421 upon these cam surfaces compresses spring 411 thereby disengaging clutch plates 412 and 413. With this operation further rotational movement conveyed to pulley 410 by means of cable 406 is isolated from the various arms of the azimuth follow-up switch.

The functions of the position follow-up switch previously described can be attained by an alternative structure which is shown in Figures 24 and 25 of the drawing. The position follow-up switch 500 shown therein features a pair of cam type discs 501 and 502 which are rigidly coupled one to the other by means of bolt 503 positioned through slots 507 and 508. This entire disc assembly is rigidly coupled to shaft 299 and rotates therewith. Bracket 506 coupled to worm wheel 302 supports a pair of contacts 504 and 505. These contacts are individually actuated by follower rollers 509 and 510 respectively.

The cam contours of discs 501 and 502 vary such that the discs apply cam action to the associated rollers. In the event disc pair 501 and 502 is rotated clockwise with respect to the position shown in Figure 25, contact 505 is closed and contact 504 remains open. Counterclockwise rotation of disc pair 501 and 502 closes contact 504 and causes contact 505 to remain in its open position. Zeroing groove 511 formed by the superimposed contours of discs 501 and 502 is adjusted in breadth by means of screw 503 and the slots of the discs. Proper adjustment of the width of this groove is necessary to secure proper make and break action of contacts 504 and 505. When follow-up switch 500 is in the zero position shown in Figure 25, cam discs 501 and 502 are adjusted with respect to rollers 509 and 510 so that a gap exists between the contacts.

During switch operation the output of control motor 81 is coupled to worm wheel 302 in the manner previously described so as to drive bracket 506 in either direction, depending on the particular up or down energization of motor 81. Cam discs 501 and 502 are rigidly coupled to shaft 299 and therefore rotate in accordance with the movements of the boom to provide position control.

The foregoing structure may be advantageously modified so that it can function as a highly accurate on-target position indicator. This indicator could be advantageously employed, for example, in conjunction with small caliber, hand operated weapons wherein it is desirable to maintain a constant check on the on-target positioning of a boom, barrel or the like throughout the firing operation. It can be readily appreciated that in hand operated weapons, wherein no constant drive power is applied to the boom or barrel to maintain the initial positioning, recoil and shock from continued firing will eventually introduce positional errors.

The indicator structure herein is operative in association with these hand operated weapons so that a relatively small movement of the boom or barrel from the on-target or zero position will give a visual indication of the error introduced by firing. With such an indication, manual operation of the hand wheel or the like can return the boom or barrel to the proper position. The structure herein notwithstanding its relative simplicity and the omission of highly complicated electrical circuitry is capable of indicating an error angular movement of the order of $1/10$ of a mil. This arrangement therefore provides for position indicator accuracy heretofore unattainable in military weapons with simplified and rugged structure.

In the initial adjustment of the indicator structure herein, the boom or barrel is zeroed in to the on-target position in any conventional manner. When the boom or barrel is positioned to the proper on-target setting, follow-up switch 500 shown in Figures 24 and 25 is zeroed by any conventional type dial mechanism which would be geared to drive worm 302, so that arm 506 will be moved to a position which opens contacts 504 and 505. As is shown in the indicator circuitry of Figure 26 which incorporates contacts 504 and 505, the closure of one or the other of these contacts is necessary to complete an energizing circuit for either indicator lamp 521 or 522 from battery source 523.

In the event that the boom or barrel movement feedback through gear 215 as previously set forth and when applied to indicator switch 500 does not effectuate the closure of one or the other of contacts 504 or 505 in response to continued firing, lamps 521 and 522 remain in a deenergized condition thereby indicating continued on-target positioning of the boom or barrel.

In the event that continued firing causes the boom to move as little as $1/10$ of a mil from the on-target angular positioning, this error motion will be fed back through gear 215 to follow-up switch 500 so as to close contact 504 or 505, thereby energizing the appropriate lamp 521 or 522 and rendering a visual indication of off-target positioning. With this occurrence, hand power may again be applied to the boom or barrel driving means in the appropriate direction and until both indicator lamps 521 and 522 are again in the deenergized condition.

It is to be understood that the above-described arrangements are illustrative of the applications of the principles of this invention. Numerous other arrangements may be devised by those skilled in the art without departing from the scope of the invention.

Having thus described the invention, what is claimed as new and desired to be secured by Letters Patent is:

1. A position indicator switch comprising a drive arm, a follow-up center contact arm, a pair of side contact arms, said drive and center contact arms interveningly positioned between said pair of side contact arms, a rotatable shaft loosely supporting said drive and side contact arms and fixedly supporting said center contact arm, a spring coupled to said side contact arms and forcibly directing said arms toward the drive arm, each of said side and center contact arms supporting individual electrical contact assemblies at the terminal ends thereof opposite said support shaft, a pair of set screws each individually supported by a different side contact arm and simultaneously contacting different side portions of said drive arm when said center contact arm is in axial alignment with said drive arm thereby centering the contact assembly of said center contact arm in open contact relationship with respect to the adjacent contact assemblies, and rotatable movement of said drive arm with respect to said support shaft to an out-of-alignment position with respect to said center contact arm carrying therewith the side contact arm positioned in the forward rotational direction whereby the spring forcibly moves the other side contact arm toward the center contact arm maintaining the contacts thereof in a closed relationship until rotational movement of said shaft drives said center contact arm into axial alignment with the drive arm.

2. A position indicator switch comprising a drive arm, a follow-up center contact arm, a pair of side contact arms, said drive and center contact arms interveningly positioned between said pair of side contact arms, a shaft supporting said drive and contact arms, a spring coupled to said side contact arms and forcibly directing said arms toward the drive arm, each of said side and center contact arms supporting individual electrical contact assemblies at the terminal ends thereof opposite said support shaft, and a pair of set screws each individually supported by a different side contact arm and simultaneously contacting different side portions of said drive arm when said center contact arm is in axial alignment with said drive arm thereby centering the contact assembly of said center contact arm in open contact relationship with respect to the adjacent contact assemblies, and rotatable movement of said drive arm with respect to said support shaft to an out-of-alignment position with respect to said center contact arm carrying therewith the side contact arm positioned in the forward rotational direction whereby the spring forcibly moves the other side contact arm toward the center contact arm maintaining the contacts thereof in a closed relationship until said center contact arm is driven into axial alignment with the drive arm.

3. A position indicator switch comprising a drive arm, a follow-up center contact arm, a pair of side contact arms, said drive and center contact arms interveningly positioned between said pair of side contact arms, a rotatable shaft loosely supporting said drive and side contact arms and fixedly supporting said center contact arm, a spring coupled to said side contact arms and forcibly directing said arms toward the drive arm, each of said side and center contact arms supporting individual electrical contacts at the terminal ends thereof opposite said support shaft, and a pair of set screws each individually supported by a different side contact arm and set to open the switch contacts when the drive and center contact arms are in axial alignment.

4. A position indicator switch comprising a drive arm, a follow-up center contact arm, a pair of side contact arms, said drive and center contact arms interveningly positioned between said pair of side contacts arms, a rotatable shaft loosely supporting said drive and side contact arms and fixedly supporting said center contact arm, means coupled to said side contact arms and forcibly directing said arms toward the drive arm, each of said side and center contact arms supporting individual electrical contacts, and a pair of spacing means each individually supported by a different side contact arm and opening the switch contacts when the drive and center contact arms are in axial alignment.

5. A position indicator switch comprising a drive arm, a follow-up contact arm, a pair of side contact arms, said drive and follow-up contact arms interveningly positioned between said pair of side contact arms, means loosely supporting said drive and side contact arms and fixedly supporting said follow-up contact arm, means coupled to said side contact arms and forcibly directing said arms toward the drive arm, each of said side and center contact arms supporting individual electrical contacts, and means opening the switch contacts when the drive and follow-up contact arms are in axial alignment.

6. A position indicator switch comprising a drive arm, a follow-up contact arm, a pair of side contact arms, said drive and follow-up contact arms interveningly positioned between said pair of side contact arms, means loosely supporting said drive and side contact arms and fixedly supporting said follow-up contact arm, means coupled to said side contact arms and forcibly directing said arms toward the drive arm, each of said side and center contact arms supporting individual electrical contacts, and means opening the switch contacts when the drive and follow-up contact arms are in axial alignment, rotatable movement of said drive arm with respect to said support means to an out-of-alignment position with respect to said follow-up contact arm carrying therewith the side contact arm positioned in the forward rotational direction whereby the other side contact arm is forcibly moved toward the follow-up contact arm maintaining the contacts thereof in a closed relationship until said follow-up contact arm is driven into axial alignment with the drive arm.

7. In an electrical switch, the combination comprising a pair of contact actuating arms, a rotatable drive arm and follow-up arm interveningly positioned between said contact actuating arms, means tending to forcibly hold said contact actuating arms in a fixed relative position with respect to said drive arm, means rotatably driving said drive arm independently of said follow-up arm whereby the contact actuating arm positioned in the forward rotational direction is carried therewith and the other contact actuating arm is separated from said drive arm by said follow-up arm until the drive arm and follow-up arm again assume their initial relative positions.

8. In an electrical switch, the combination comprising a pair of contact actuating arms, a rotatable drive arm and follow-up arm interveningly positioned between said contact actuating arms, means tending to hold said contact actuating arms in a fixed relative position with respect to said drive arm, means rotatably driving said drive arm independently of said follow-up arm whereby the contact actuating arm positioned in the forward rotational direction is carried therewith and the other contact actuating arm is separated from said drive arm by said follow-up arm, means rotatably driving the follow-up arm independently of said drive arm whereby said separated contact actuating arm is returned to its initial positioning with respect to said drive arm.

9. In an electrical switch, the combination comprising a pair of contact actuating means, a rotatable drive arm and follow-up arm interveningly positioned between said contact actuating arms, a shaft supporting said arms, a spring tending to forcibly hold said contact actuating arms against said drive arm, means rotatably driving said drive arm independently of said follow-up arm whereby the contact actuating arm positioned in the forward rotational direction is carried therewith and the other contact actuating arm is separated from said drive arm by said follow-up arm, said shaft rotatably driving the follow-up arm independently of said drive arm whereby said separated contact actuating arm is returned to its initial positioning with respect to said drive arm when said drive arm and follow-up arm are in alignment.

10. An electrical switch, comprising a pair of contact actuating arms each actuating individual contacts, a rotatable drive arm and follow-up arm interveningly positioned between said contact actuating arms, a shaft supporting said arms, means tending to forcibly hold said contact actuating arms in a fixed position with respect to said drive arm when said follow-up arm is in alignment with said drive arm, and means rotatably driving said drive arm independently of said follow-up arm whereby the contact actuating arm positioned in the forward rotational direction is carried therewith and the other contact actuating arm is separated from said drive arm by said follow-up arm thereby actuating the contact of said separated arm, said shaft rotatably driving the follow-up arm independently of said drive arm whereby said separated contact actuating arm is returned to its initial positioning with respect to said drive arm.

11. A control system for positioning a device from a remote control point, electrical means for driving said device to commanded positions, a drive arm, a follow-up contact arm, a pair of side contact arms each actuating individual electrical contacts, said drive and follow-up contact arms interveningly positioned between said pair of side contact arms, a rotatable shaft loosely supporting said drive and side contact arms and fixedly supporting said follow-up contact arm, means coupled to said side contact arms and forcibly directing said arms toward the drive arm, means for rotatably driving said drive arm about said shaft in accordance with a commanded position whereby the contact actuating arm positioned in the forward rotational direction is carried therewith and the other contact actuating arm is separated from said drive arm by said follow-up arm thereby actuating an electrical contact and completing the energizing circuit for said electrical means, and means for coupling the resulting movement of said device to the shaft whereby the follow-up arm is caused to follow said drive arm with said electrical contact being opened when said follow-up arm attains an alignment position with said drive arm.

12. A control system for positioning a device from a remote control point, electrical means for driving said device to commanded positions, a drive arm, a follow-up contact arm, a pair of side contact arms each actuating individual electrical contacts, said drive and follow-up contact arms interveningly positioned between said pair of side contact arms, a rotatable shaft loosely supporting said drive and side contact arms and fixedly supporting said follow-up contact arm, means coupled to said side contact arms and forcibly directing said arms toward the drive arm, means for rotatably driving said drive arm about said shaft in accordance with a commanded position whereby the contact actuating arm positioned in the forward rotational direction is carried therewith and the other contact actuating arm is separated from said drive arm by said follow-up arm thereby actuating the electrical contact of the separated arm and completing the energizing circuit for said electrical means, and means for coupling the resulting movement of said device to the shaft whereby the follow-up arm is caused to follow said drive arm with said electrical contact being opened when said follow-up arm attains an alignment position with said drive arm.

13. A control system for positioning a device from a remote control point, electrical means for driving said device to commanded positions, a drive arm, a follow-up contact arm, a pair of side contact arms each actuating individual electrical contacts, said drive and follow-up contact arms interveningly positioned between said pair of side contact arms, a shaft loosely supporting said drive and side contact arms and fixedly supporting said follow-up contact arm, a spring coupled to said side contact arms and forcibly directing said arms toward the drive arm, means for rotatably driving said drive arm about said shaft in accordance with a commanded position whereby the contact actuating arm positioned in the forward rotational direction is carried therewith and the other contact actuating arm is separated from said drive arm by said follow-up arm thereby actuating the electrical contact of the separated arm and completing the energizing circuit for said electrical means, and means for coupling the resulting movement of said device to the shaft whereby the follow-up arm is caused to follow said drive arm with said electrical contact being opened when said follow-up arm attains an alignment position with said drive arm.

14. A control system for positioning a device from a remote control point, electrical means for driving said device to commanded positions, a drive arm, a follow-up contact arm, a pair of side contact arms, each of said side and follow-up contact arms supporting individual electrical contact assemblies at the terminal ends thereof, said drive and follow-up contact arms interveningly positioned between said pair of side contact arms, a pair of set screws each individually supported by a different side contact arm and simultaneously contacting different side portions of said drive arm when said center contact arm is in axial alignment with said drive arm thereby centering the contact assembly of said center contact arm in open contact relationship with respect to the adjacent contact assemblies, a shaft loosely supporting said drive and side contact arms and fixedly supporting said follow-up contact arm, means coupled to said side contact arms and forcibly directing said arms toward the drive arm, means for rotatably driving said drive arm about said shaft in accordance with a commanded position whereby the contact actuating arm positioned in the forward rotational direction is carried therewith and the other contact actuating arm is separated from said drive arm by said follow-up arm thereby closing the electrical contact between the separated arm and the follow-up arm and completing the energizing circuit for said electrical means, and means for coupling the resulting movement of said device to the shaft whereby the follow-up arm is caused to follow said drive arm with said electrical contact being opened when said follow-up arm attains an alignment position with said drive arm.

15. A control system for positioning a device from a remote point, electrical means for driving said device to commanded positions, a switch including a pair of rotatable arms, means for rotatably driving one of said arms through an angular distance corresponding to the desired positioning of said device, means for actuating an electrical contact when said arms are out of alignment with respect to one another thereby completing the energizing circuit for said electrical driving means, and means for coupling the resulting movement of said device to the second of said arms in such a direction as to cause the second arm to follow the movement of said first arm, said electrical contact being opened when said arms are moved into alignment with respect to one another.

16. A control system for positioning a device from a remote point, electrical means for driving said device to a commanded position in either direction from a reference position, a switch including a pair of rotatable arms which are in axial alignment when said device is in its reference position, means for rotatably driving one of said arms through a clockwise or counterclockwise angular distance corresponding to the desired directional positioning of said device, an electrical transfer contact including said second arm with a particular one of the contact combinations thereof being closed when said arms are out of alignment with respect to one another thereby completing an appropriate energizing circuit for said electrical driving means, and means for coupling the resulting movement of said device to the second of said arms in such a direction as to cause the second arm to follow the movement of said first arm, said closed electrical contact being open when said arms are moved into alignment with respect to one another thereby de-energizing said electrical means.

17. A control system for positioning a device from a remote point, electrical means for driving said device to a commanded position in either direction from a reference position, a switch including a pair of rotatable arms which are in axial alignment when said device is in its reference position, means including an electrical bridge for rotatably driving one of said arms through a clockwise or counterclockwise angular distance corresponding to the desired directional positioning of said device, an electrical transfer contact including said second arm with a particular one of the contact combinations thereof being closed when said arms are out of alignment with respect to one another thereby completing an appropriate energizing circuit for said electrical driving means, and means for coupling the resulting movement of said device to the second of said arms in such a direction as to cause the second arm to follow the movement of said first arm, said closed electrical contact being opened when said arms are moved into alignment with respect to one another thereby de-energizing said electrical means.

18. A control system for positioning a device, comprising follow-up means coupled to said device and movable in correspondence with the movement of said device and in a substantially amplified manner, means movable in response to commanded changes in position, means for moving said device from a reference position which corresponds to a specified positioning of said first and second means with respect to a reference point, means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference pont, and means disengaging said follow-up means from said device when said device is moved outside a defined portion of its possible range of movements less than the whole range.

19. A control system for positioning a device comprising follow-up means including a pair of cams movable in association with the movement of said device, means including a contact movable in response to commanded changes in position, means for moving said device from a reference position which corresponds to a specified positioning of said first and second means with respect to a reference point, and means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point.

20. A control system for positioning a device comprising follow-up means including a pair of cams fixedly coupled one to the other with opposing cams contours movable in association with the movement of said device, means including a pair of electric contacts movable in response to commanded changes in position, electrical means for moving said device from a reference position which corresponds to a specified positioning of said first and second means with respect to a reference point, and means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point.

21. A control system for angularly positioning a device comprising follow-up means movable in amplified angular correspondence with the angular movement of said device over a portion of its operative angular range less than the total range of movement, means movable in response to commanded changes in position, means for moving said device from a reference position which corresponds to a specified positioning of said first and second means with respect to a reference point, and means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point.

22. A control system for positioning a device about a fixed pivot comprising follow-up means movable in amplified angular correspondence with the angular movement of said device over a portion of its operative angular range less than the total range of movement, means movable in response to commanded changes in position and over substantially the same limits as said follow-up means, means for moving said device from a reference position which corresponds to a specified positioning of said first and second means with respect to a reference point, and means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point.

23. A control system for positioning a device, comprising a first switch element carrying a contact movable in amplified correspondence with the movement of said device over a portion of its operative range less than the total range of movement for said device, a second switch element movable in response to commanded changes in position for said device within said portion of operative movable range, means for moving said device in either direction from a reference position midway within said portion of operative range which corresponds to a specified positioning of both of said switch elements with respect to a switch reference point, and means including said switch elements for actuating said device moving means in either of its operative directions in response to the particular commanded directional movement of said second switch element with respect to said switch reference point, said device moving means being actuated until said first switch element attains a relative follow-up positioning with respect to said second switch element which is identical to the relative positioning of the switch elements at the switch reference point.

24. The combination of claim 23 wherein one of said first and second switch elements includes an electrical contact which is part of the energizing circuit for said device moving means and the other of said means includes a cam actuating said contact.

25. A control system for angularly positioning a device from a remote control point, comprising means movable in amplified angular correspondence with the angular movement of said device over a portion of its operative movable range less than the total range of angular movement, means for establishing a commanded change in position for said device within said portion of operative movable range, a first switch element rotatably driven by said first means, and a second switch element rotatably driven by said second means in either direction from a reference point for both of said switch elements, means for moving said device in either direction from a reference position midway within said portion of operative range and corresponding to the positioning of both of said switch elements at the reference point, and means including said switch elements for actuating said device moving means in either of its operative directions in response to the particular directional movement of said second switch element with respect to said switch reference point, said device moving means being actuated until said first switch element attains a relative follow-up positioning with respect to said second switch element which is identical to the relative positioning of the switch elements at the switch reference position.

26. A control system for positioning a device from a remote control point, comprising follow-up means movable in amplified angular correspondence with the movement of said device over a portion of its operative movable range less than the total range of angular movement, means for establishing a commanded change in position for said device within said portion of operative movable range, a first switch element rotatably driven by said first means, and a second switch element rotatably driven by said second means in either direction from a reference point for both of said switch elements, means for moving said device in either direction from a reference position within said portion of operative range and corresponding to the positioning of both of said switch elements at the reference point, and means including said switch elements for actuating said device moving means in either of its operative directions in response to the particular directional movement of said second switch element with respect to said switch reference position, said device moving means being actuated until said first switch element attains a relative follow-up positioning with respect to said second switch element which is identical to the relative positioning of the switch elements at the switch reference position.

27. A system for indicating the position of a device comprising a switch including two rotatable and relatively movable elements, follow-up means movable in amplified correspondence with the movement of said device over a portion of the device operative range, said follow-up means being connected to one of said switch elements and rotatably driving said element relative to the other, a pair of position indicating circuits each including individually associated circuit closing means, and means including said other switch element actuating one or the other of said circuit closing means in response to the movement of said second switch element from an initial reference positioning for both of said switch elements whereat both indicating circuits are de-energized.

28. The combination of claim 27 including means for disengaging said switch element from said follow-up means in response to the movement of said device outside of said portion of operative range.

29. The combination of claim 28 wherein said disengaging means includes a clutch.

30. The combination of claim 27 wherein one of said switch elements includes a pair of cams fixedly coupled one to the other with opposing cam contours and the other switch element includes an arm supporting said circuit closing means in operative relationship with respect to said cams.

31. A control system for positioning a device, comprising follow-up means movable in association with the movement of said device, means movable in response to commanded changes in position, means for moving said device from a reference position which corresponds to a specified positioning of said first and second means with respect to a reference point, one of said first and second means including an electrical contact which is part of an energizing circuit for said device moving means and the other of said means including a cam actuating said contact, and means including said first and second means for actuating said device moving means in response to the commanded movement of said second means with respect to said reference point, said device moving means being actuated until said first means attains a relative followup positioning with respect to said second means which is identical to the relative positioning of the first and second means at the reference point.

32. A control system for positioning a device, comprising follow-up means movable in association with the movement of said device, means movable in response to commanded changes in position, means for moving said device from a reference position which corresponds to a specified positioning of said first and second means with respect to a reference point, one of said first and second means including a pair of contacts which are individually and separately closed to complete a reversing energizing circuit for said device moving means, and the other of said means including a pair of cams fixedly coupled one to the other with opposing contours and actuating one or the other of said contacts depending upon the direction of relative rotation of said contacts with respect to said contact pair, and means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point.

33. A control system for positioning a device comprising follow-up means movable in amplified correspondence with the movement of said device over a portion of its operative range, means movable in response to commanded changes in position, means for moving said device from a reference position which corresponds to a specified positioning of said first and second means with respect to a reference point, means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point, and means for disengaging said follow-up means from said device in response to the movement of said device outside of said portion of operative range.

34. A control system for positioning a device comprising follow-up means movable in amplified correspondence with the movement of said device over a portion of its operative range, means movable in response to commanded changes in position, means for moving said device from a reference position which corresponds to a specified positioning of said first and second means with respect to a reference point, means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point, and means including a clutch for disengaging said follow-up means from said device in response to the movement of said device outside of said portion of operative range.

35. A control system for positioning a device comprising follow-up means movable in amplified correspondence with the movement of said device over a portion of its operative range, means movable in response to commanded changes in position and over substantially the same limits as said follow-up means, means for moving said device from a reference position which corresponds to a specified positioning of said first and second means with respect to a reference point, one of said first and second means including an electrical contact which is part of the energizing circuit for said device moving means and the other of said means including a cam actuating said contact, and means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point.

36. A control system for positioning a device comprising follow-up means movable in amplified correspondence with the movement of said device over a portion of its operative range, means movable in response to commanded changes in position and over substantially the same limits as said follow-up means, means for moving said device from a reference position which corresponds to a specified positioning of said first and second means with respect to a reference point, one of said first and second means including a pair of contacts which are individually and separately closed to complete a reversing energizing circuit for said device moving means, and the other of said means including a pair of cams fixedly coupled one to the other with opposing contours and actuating one or the other of said contacts depending upon the direction of relative rotation of said contacts with respect to said contact pair, and means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point.

37. A control system for positioning a device comprising follow-up means movable in amplified correspondence with the movement of said device over a portion of its operative range, means movable in response to commanded changes in position and over substantially the same limits as said follow-up means, means for moving said device from a reference position which corresponds to a specified positioning of said first and second means with respect to a reference point, means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point, and means for disengaging said follow-up means from said device in response to the movement of said device outside of said range.

38. A control system for positioning a device comprising follow-up means movable in amplified correspondence with the movement of said device over a portion of its operative range, means movable in response to commanded changes in position and over substantially the same limits as said follow-up means, means for moving said device from a reference position which corresponds to a specified positioning of said first and second means with respect to a reference point, means including said first and second means for actuating said device moving means in response to the commanded movement of said second means with respect to said reference point, said device moving means being actuated until said first means attains a relative follow-up positioning with respect to said second means which is identical to the relative positioning of the first and second means at the reference point, and means including a clutch for disengaging said follow-up means from said device in response to the movement of said device outside of said portion of operative range.

39. A control system for positioning a device, comprising a first switch element movable in amplified correspondence with the movement of said device over a portion of its operative range, a second switch element movable in response to commanded changes in position for said device within said portion of operative movable range, means for moving said device in either direction from a reference position midway within said portion of operative range which corresponds to a specified positioning of both of said switch elements with respect to a switch reference point, said first and second switch elements including a pair of contacts which are individually and separately closed to complete a reversing energizing circuit for said device moving means and the other of said means including a pair of cams fixedly coupled one to the other with opposing contours and actuating one or the other of said contacts depending upon the direction of relative rotation of said contacts with respect to said contact pair, and means including said switch elements for actuating said device moving means in either of its operative directions in response to the particular commanded directional movement of said second switch element with respect to said switch reference point, said device moving means being actuated until said first switch element attains a relative follow-up positioning with respect to said second switch element which is identical to the relative positioning of the switch elements at the switch reference point.

40. A control system for positioning a device, comprising a first switch element movable in amplified correspondence with the movement of said device over a portion of its operative range, a second switch element movable in response to commanded changes in position for said device within said portion of operative movable range, means for moving said device in either direction from a reference position midway within said portion of operative range which corresponds to a specified positioning of both of said switch elements with respect to a switch reference point, means including said switch elements for actuating said device moving means in either of its operative directions in response to the particular commanded directional movement of said second switch element with respect to said switch reference point, said device moving means being actuated until said first switch element attains a relative follow-up positioning with respect to said second switch element which is identical to the relative positioning of the switch elements at the switch reference point, and means for disengaging said first switch element from said device in response to the movement of said device outside of said portion of operative range.

41. A control system for positioning a device, comprising a first switch element movable in amplified correspondence with the movement of said device over a portion of its operative range, a second switch element movable in response to commanded changes in position for said device within said portion of operative movable range, means for moving said device in either direction from a reference position midway within said portion of operative range which corresponds to a specified positioning of both of said switch elements with respect to a switch reference point, means including said switch elements for actuating said device moving means in either of its operative directions in response to the particular commanded directional movement of said second switch element with respect to said switch reference point, said device moving means being actuated until said first switch element attains a relative follow-up positioning with respect to said second switch element which is identical to the relative positioning of the switch elements at the switch reference point, and means including a clutch for disengaging said first switch element from said device in response to the movement of said device outside of said portion of operative range.

42. A control system for angularly positioning a device from a remote control point, comprising means movable in amplified correspondence with the movement of said device over a portion of its operative movable range, means for establishing a commanded change in position for said device within said portion of operative movable range, a first switch element rotatably driven by said first means, and a second switch element rotatably driven by said second means in either direction from a reference point for both of said switch elements, means for moving said device in either direction from a reference position midway within said portion of operative range and corresponding to the positioning of both of said switch elements at the reference point, means including said switch elements for actuating said device moving means in either of its operative directions in response to the particular directional movement of said second switch element with respect to said switch reference point, said device moving means being actuated until said first switch element attains a relative follow-up positioning with respect to said second switch element which is identical to the relative positioning of the switch elements at the switch reference position, and means for disengaging said first switch element from said first means in response to the movement of said device outside of said portion of operative range.

43. A control system for angularly positioning a device from a remote control point, comprising means movable in amplified correspondence with the movement of said device over a portion of its operative movable range, means for establishing a commanded change in position for said device within said portion of operative movable range, a first switch element rotatably driven by said first means, and a second switch element rotatably driven by said second means in either direction from a reference point for both of said switch elements, means for moving said device in either direction from a reference position midway within said portion of operative range and corresponding to the positioning of both of said switch elements at the reference point, means including said switch elements for actuating said device moving means in either of its operative directions in response to the particular directional movement of said second switch element with respect to said switch reference point, said device moving means being actuated until said first switch element attains a relative follow-up positioning with respect to said second switch element which is identical to the relative positioning of the switch elements at the switch reference position, and means including a clutch for disengaging said first switch element from said first means in response to the movement of said device outside of said portion of operative range.

44. A control system for accurately positioning a pivoted device within an operative angular range, comprising means for angularly moving said device, means for translating the angular movement of said device over a portion of said range less the whole thereof into a substantially amplified angular movement, follow-up means driven by said translating means and movable in amplified angular correspondence with the movement of said device over said portion of operative range, means movable in response to commanded changes in position, means for driving said movable means from a specified positioning relative said follow-up means and in accordance with a commanded change in the angular positioning of said device, said driving means including means for translating a driving angular movement into a substantially reduced angular movement of said movable means, and means including said follow-up and movable means for actuating said device moving means in response to the commanded movement of said movable means from said specified relative positioning, said device moving means being actuated until said follow-up means attains a relative follow-up positioning with respect to said movable means which is identical to the specified relative positioning of the follow-up and movable means.

References Cited in the file of this patent

UNITED STATES PATENTS

| 1,293,296 | Andersen | Feb. 4, 1919 |
|---|---|---|
| 2,339,289 | Olken | Jan. 18, 1944 |